(12) United States Patent
Cerwin

(10) Patent No.: US 11,571,753 B1
(45) Date of Patent: Feb. 7, 2023

(54) ROTARY BORING TOOL ALIGNMENT DEVICE AND SYSTEM

(71) Applicant: John Cerwin, Gurnee, IL (US)

(72) Inventor: John Cerwin, Gurnee, IL (US)

( * ) Notice: Subject to any disclaimer, the term of this patent is extended or adjusted under 35 U.S.C. 154(b) by 11 days.

(21) Appl. No.: 16/418,256

(22) Filed: May 21, 2019

Related U.S. Application Data

(60) Provisional application No. 62/674,081, filed on May 21, 2018.

(51) Int. Cl.
*B23B 49/02* (2006.01)

(52) U.S. Cl.
CPC ........ *B23B 49/02* (2013.01); *B23B 2260/092* (2013.01); *Y10T 408/569* (2015.01)

(58) Field of Classification Search
CPC .... B23B 49/02; B23B 49/026; Y10T 408/569
See application file for complete search history.

(56) References Cited

U.S. PATENT DOCUMENTS

| | | | | |
|---|---|---|---|---|
| 3,049,031 A * | 8/1962 | Carstens | ............... | B23B 49/026 408/76 |
| 3,851,990 A * | 12/1974 | West | ..................... | B23B 49/026 408/1 R |
| 4,023,907 A * | 5/1977 | Chang | ................... | B23B 49/026 356/138 |
| 7,331,113 B1 * | 2/2008 | Patrick | .................... | B25F 5/021 33/286 |
| 7,375,361 B2 * | 5/2008 | Turner | ................. | B25H 1/0092 250/559.29 |
| 7,549,826 B2 * | 6/2009 | Videtto | .................... | B23B 47/34 408/1 R |
| 7,883,301 B2 * | 2/2011 | Oostman | .................. | H02G 3/00 408/67 |
| 7,992,311 B2 * | 8/2011 | Cerwin | ................ | B25H 1/0092 33/286 |
| 10,150,167 B2 * | 12/2018 | Cerwin | .................. | G01B 11/26 |
| 10,486,242 B2 * | 11/2019 | Kasahara | ................ | B23B 49/00 |
| 10,739,127 B2 * | 8/2020 | Cerwin | ................ | B23B 49/006 |
| 10,857,641 B2 * | 12/2020 | DeYoe | ............... | B23Q 17/2404 |
| 2007/0020055 A1 * | 1/2007 | Ore | ........................ | B23B 49/026 408/76 |
| 2007/0030486 A1 * | 2/2007 | Gelbart | .................. | G01B 11/27 356/399 |

FOREIGN PATENT DOCUMENTS

GB         2313563 A    * 12/1997    ........... B23B 49/026
GB         2472230 A    *  2/2011    ........... B23B 49/026

* cited by examiner

*Primary Examiner* — Eric A. Gates
(74) *Attorney, Agent, or Firm* — IP Law Leaders PLLC; Andrew C. Aitken

(57) ABSTRACT

A device and system for a rotary boring tool that enables a user to align the tool with respect to a target work surface is disclosed. The alignment system includes a rotating member that is mounted on the rotating portion of a rotary boring tool, and a separate portable stationary member that is designed to reside on the work surface. The rotating member includes a focused light source, such as a laser, that projects a light beam parallel to the direction of the rotary boring tool bit onto the stationary member which reflect the beam and produces a visible pattern on the surface of the stationary member that indicates alignment or misalignment of the rotary boring tool with respect to the work surface.

25 Claims, 11 Drawing Sheets

ROTARY BORING TOOL ALIGNMENT DEVICE AND SYSTEM

REFERENCE TO RELATED APPLICATIONS

The Applicant claims the benefit of the filing date of U.S. Application No. 62/674,081 filed on May 21, 2018.

FIELD OF THE INVENTION

The present invention is directed to precision rotary boring tool alignment systems.

BACKGROUND OF THE INVENTION

Craftsmen and women often experience difficulty in maintaining correct alignment of a rotary boring tool with a work surface such as a wooden workpiece being drilled by a hand-held power drill. It is also desirable to be able to drill perpendicular to walls, floors and ceiling, as well as to structural elements such as joists, beams, columns, posts and rails. Maintaining proper alignment is especially true when drilling longer distances as a minor initial misalignment of a rotary boring tool with regards to a work surface can ultimately result in a non-perpendicular or severely angled bore hole. In other circumstances, such as wood, metal or composite joining applications, it is desirable to align a bore hole at a predetermined angle with respect to the work surface.

In addition to drilling into wood, concrete, composites and stone, other applications that can benefit from precision directional drilling include the aviation industry (or other manufacturing related industries) where there is drilling into metals and composites, and in the medical field where there are drilling or cutting applications into bodily tissues such as bone.

There is a continuing need for an apparatus that will help a user to maintain correct alignment of a rotary boring tool with regards to a work surface. This need is especially acute when drilling longer distances into a surface.

BRIEF DESCRIPTION OF THE INVENTION

The present invention is directed to precision rotary boring tool alignment systems. In various embodiments of the invention a rotary boring tool alignment system is provided to improve both the functionality and usability of rotary boring tools, such as drills. The system of the invention includes a stationary annular ring member used in conjunction with a rotating tool or drill having a light beam that is projected parallel to the boring direction of the tool. Such rotatory tools include but are not limited to handheld-power drills, manual drills, stationary drill presses, smaller rotary tools such as Dremel® tools, as well as larger boring devices such as earth or natural resource boring machinery. In addition, the system can be used on other types of rotating machinery such as milling machines and lathes.

An advantage of the system is that the alignment or misalignment pattern remains consistent regardless of the distance between the rotating member and the stationary member. Further, since the system is based on projected light, there is no need for a physical connection between the worksurface and the drill, or between the rotating and stationary members of the system.

In various embodiments the system may also provide different stationary member mounting options, guidance for optimal bit placement on the work surface, angled mounting options, drill bit depth detection and reporting, sub-surface object detection, such as studs, joists, conduits and other chases in walls), debris collection, or wireless functionality.

DETAILED DESCRIPTION OF PREFERRED EMBODIMENTS

Figure 1:
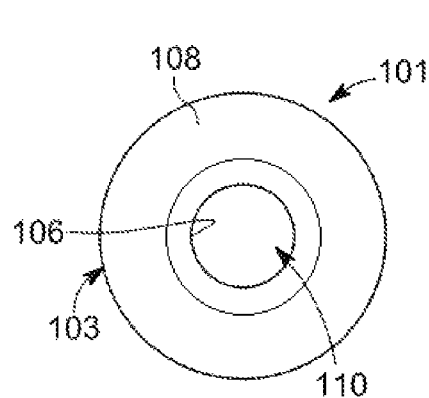
FIG. 1 is a top view of a portable stationary member used with the rotary boring tool alignment system according to an embodiment of the invention.

In the following description, like reference characters designate like or corresponding parts throughout several views. Referring in more detail to the drawings, a device embodying the principles and concepts of the present invention are described, the first embodiment of the stationary member is generally designated by the reference numeral 101.

For purposes of simplicity, the system embodiments described herein are provided in the context of hand-held power drills. It will be appreciated, however, that the advantages provided by the system disclosed are equally applicable to other types of rotary drilling tools and/or boring machinery. These advantages include, but are not limited to, visual work surface alignment and visual drill bit or cutting tool depth indication.

With regards to proper alignment, the system allows a drill user to quickly determine if a drill bit is aligned directly perpendicular to a work surface or item that is being drilled by visual reference to the stationary member. Proper alignment is desirable because it will provide for a borehole that is completely perpendicular to the surface through which the cutting member penetrates. Since the system does not rely on gravity, the orientation of the work surface in space is inconsequential. Further, the system does not rely on sensors or electronic computing for alignment, so the system is both simple and can be provided at relatively low cost.

As described and illustrated herein, the system provides a visual alignment reference on a stationary member that remains a consistent size and shape when a drill bit is aligned and boring into the work surface. The system allows for a consistent alignment reference during drilling operations regardless of drill bit length or operational bit depth in the work surface. The consistent size and shape of the visual alignment reference also makes the system easier to understand and use for drill operators which in turn leads to greater work surface alignment accuracy.

Accordingly, the system consists of two separate members, a light source that is integrated into, affixed onto, or mounted about the rotating portion of the rotary boring tool and a stationary member that is adapted to be placed on the work surface. The light source rotates in conjunction with the rotating portion of the rotary boring element or drill. The stationary member resides on a work surface and, in embodiments, generally mirrors the planar surface or the material that is being drilled. In a contemplated alternative embodiment, the stationary member is positioned at a fixed angle with respect to the working surface and a borehole may therefore be created at a fixed angle into the surface. In yet further embodiments, the bottom surface of the stationary member may take the shape of non-planar surfaces.

Now referring to FIG. 1, a stationary member 101 that is in the shape of a right cylinder with a central aperture 110 and has exterior sidewall 103, interior sidewall 106, and top surface 108.

Figure 2:
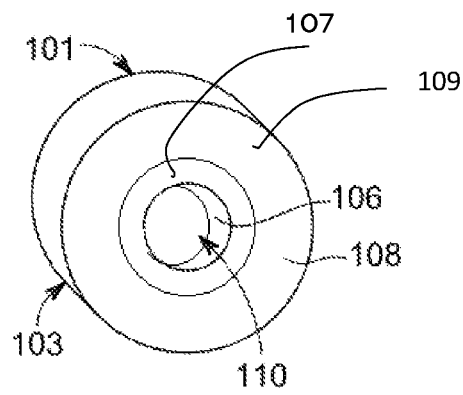
FIG. 2 is a perspective view of the member depicted in FIG. 1.

FIG. 2 depicts a perspective view of portable stationary member 101 where it is apparent that the device is a short cylinder or annular ring with exterior sidewall 103, interior sidewalls 106, top surface 108 and a central hole 110 though the middle. When placed on a worksurface, the central hole 110 exposes the worksurface. In the embodiments of FIGS. 1-2, stationary member 101 has a flat planar lower surface (not shown) that is configured to reside against a work surface and generally mirrors a planar surface of the item that is being drilled. The top surface 108 of stationary member 101 is also a flat planar surface having an inner transparent region 107 through which a focused light beam is projected from a light source and an outer translucent section 109. As depicted below, the light beam interacts with various reflective surface configurations within the stationary member 101 to produce a visual indication of drill bit alignment or misalignment.

Figure 3:
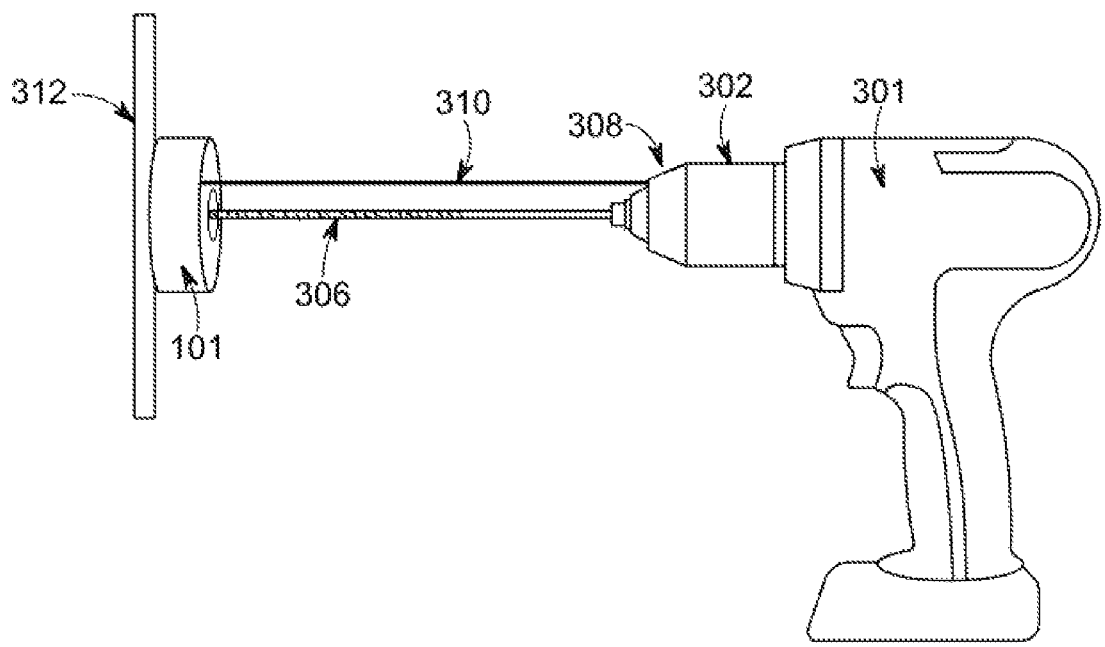
FIG. 3 is a view in elevation showing the arrangement of the stationary member and boring member according to an embodiment of the invention with an integrated light source.

Now referring to FIG. 3, in this embodiment a system is depicted including a rotating member or drill bit 306 is integrated with rotating portion 302 of power drill 301. Rotating portion 302 contains a focused light beam source 308 that is projected along path 310 parallel to drill bit 306 and directed towards the stationary member 101 on the work surface 312. In embodiments, the focused light beam is created by a laser, but can be created by other light beam sources known in the art. FIG. 3. accordingly depicts a rotary boring tool alignment system that includes a stationary member 101 and penetrating tool.

In the embodiment depicted in FIG. 3, portable stationary member 101 is positioned against the worksurface 312. A rotary boring instrument 301 is positioned so that the bit 306 is generally in the center of the central hole 110 within the stationary member 101. Central hole 110 has a diameter larger than the diameter of the drill bit. A focused input light beam 310 from is projected from a light source 308 out of the rotating portion 302 or drill 301. In this embodiment, the light source 308 is integrated into the rotating member 302.

Figure 4:
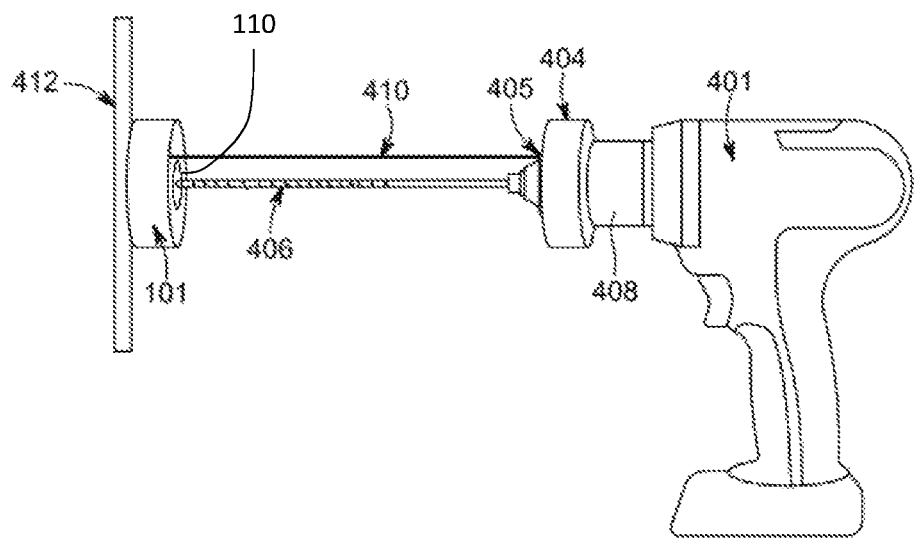
FIG. 4 is a view in elevation showing the arrangement of the stationary member and boring member according to a further embodiment of the invention wherein a light source is attached to a rotating element of the boring member.

FIG. 4 also depicts an alternative embodiment of a boring tool alignment system similar to that depicted in FIG. 3 but light source 405 is mounted on member 404 that is configured to be affixed to or mounted about the rotating portion 408 of the rotary boring tool 401. In this embodiment, the light source 405 is integrated into the separate member 404 that is attached to a conventional drill. Member 404 is attached via a clamping mechanism that attaches onto the rotating portion of the rotary boring instrument (such as the chuck). In an alternative embodiment, a member containing the light beam source is a press-fit mechanism that attaches onto the rotating portion of the rotary boring instrument such as the chuck. In such an embodiment the separate rotating member can be temporarily and/or quickly mounted and dismounted from the power drill. In yet a further embodiment the rotating member is comprised of fabric or a flexible material that can adapt to the shape of the rotating portion of the rotary boring instrument.

In the embodiments described and illustrated in FIGS. 5, and 9-12 herein, the system creates different visible semi-circular patterns on a stationary member 101. When the drill is properly aligned and perpendicular to the top surface of the stationary member, the reflected image is in the shape of a continuous circle or annular ring. The misalignment of semi-circular patterns on the stationary member signifies that the penetrating member is not perpendicular to the top surface of the stationary member, and thus the work surface, and corrective action should be taken.

Figure 5:
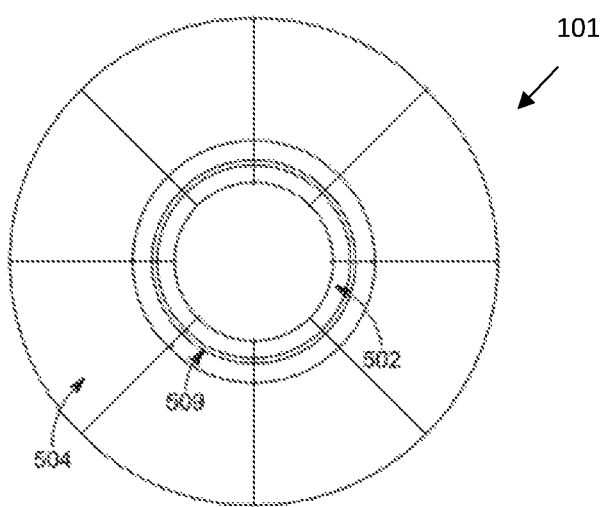
FIG. 5 is a top view of a portable stationary member depicting a plurality of segments each having reflective surfaces contained therein.

FIG. 5 depicts a top view of stationary member 101 used with the boring tool alignment system of the invention. In this embodiment, there are two different regions on the top surface of stationary member 101, a first region 502, which is transparent and nearest the central hole 110 and second region 504, a translucent annular region outside of first region 502. First region 502 is generally transparent so that a focused input light beam can penetrate the top surface 108 of stationary member 101. When the rotating member is rotated, the focused light beam also rotates and creates an entry pattern 509 on first region 502 in a generally circular form. Since first region 502 is transparent, pattern 509 cannot typically be seen by the user because it penetrates the member 101 and is only depicted here for reference. Second surface 504 is translucent or transmissive so that when the focused input light beam is internally reflected back to the bottom of second region 504 it is visible to the rotary boring tool user in or on the second region of 504 as an alignment or misalignment pattern or patterns.

Figure 6:
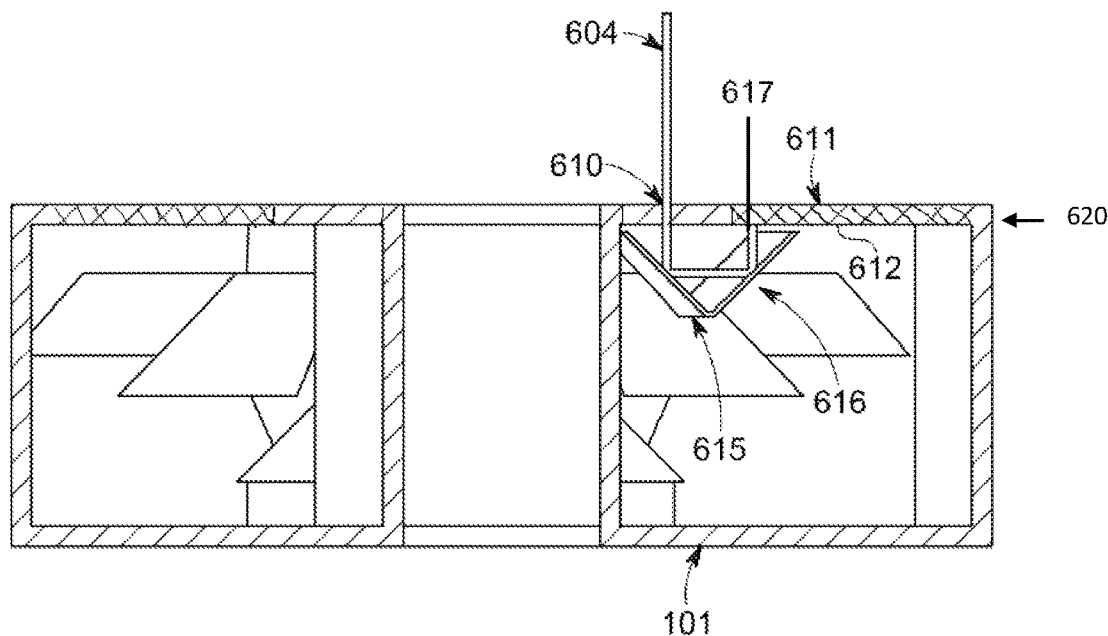
FIG. 6 is a side sectional view in elevation of a portable stationary member depicting the path light as it is guided from a first set of reflective surfaces.

FIG. 6 depicts a sectional view of the stationary member 101 that generally shows two different reflective surface configurations contained within member 101. The configuration illustrated includes reflective surfaces 615 and 616. Light beam 604 enters stationary member 101 though transparent region 610 of top layer 620. Beam 604 is first reflected off surface 615 which orients beam 604 from a direction perpendicular to the top surface to a direction that is horizontal to top layer 620. Next beam 604 is reflected off reflective surface 616 back toward the beam source and hits the bottom surface 612 top layer 620. The region 611 at the location when the beam hits the lower surface 612 is translucent (or transmissive) and, consequently, the beam creates a visually perceptible light image at the impingement location.

The forgoing arrangement, referred to as the "short leg," thereby involves focused input light beam 604 penetrating the top layer of stationary member 101 through the first transparent region 610. Input light beam 604 is then reflected off two reflective surfaces 615 and 616, which may be mirrors or surfaces with highly reflective coatings and then against the inner lower surface 612 which is visible because this area 611 of the top layer 620 is translucent or transmissive at this region. As the rotating member of the system rotates, focused light beam 604 also rotates and produces a semi-circular alignment or misalignment pattern (or patterns) on the lower surface 612. The "short leg" path (depicted in FIG. 6) returns to the top surface of the annular member at substantially the same impingement location regardless of alignment or misalignment, whereas the "long leg" path (depicted in FIG. 7) only comes back to the same impingement location as the "short leg" when the drill is substantially perpendicularly aligned. While the "short leg" impingement location is slightly off with a misalignment, the amount of displacement is very small and difficult to perceive.

Figure 7:
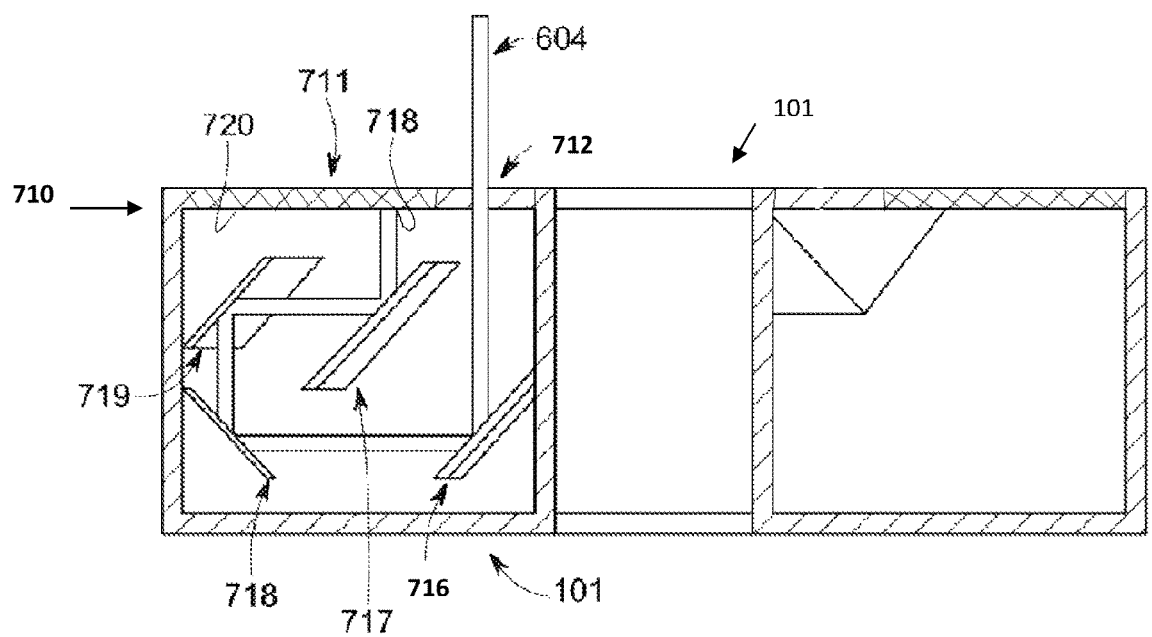
FIG. 7 is a side sectional view in elevation of a portable stationary member depicting the path light guided from a second set of reflective surfaces.

FIG. 7 depicts a second cross section of stationary member 101. This depiction shows a reflective surface configuration with four reflective surfaces, referred to as the "long leg." In this "long leg" reflective surface configuration the focused input light beam 604 penetrates the top layer 710 of stationary member 101 through region 712 and is reflected off four surfaces 716, 718, 719 and 717 and then impinges on lower surface 720 of the top layer 710. The light is visible through the top layer because the region 711 is translucent or transmissive.

When the rotating member of the system is rotating, the focused light beam also rotates and produces a semi-circular alignment or misalignment pattern, or patterns, on the inside of the second surface 720 that are visible to the rotary boring tool user. When the rotary boring tool is rotating and aligned perpendicularly with the stationary member 101, the "short leg" and "long leg" translucent or transmissive surface patterns form a continuous circle. Conversely, when the rotary boring tool is rotating and misaligned perpendicularly with the stationary member 101, the "short leg" and "long leg" translucent or transmissive surface patterns form a discontinuous pattern that does not line up.

Figure 8:
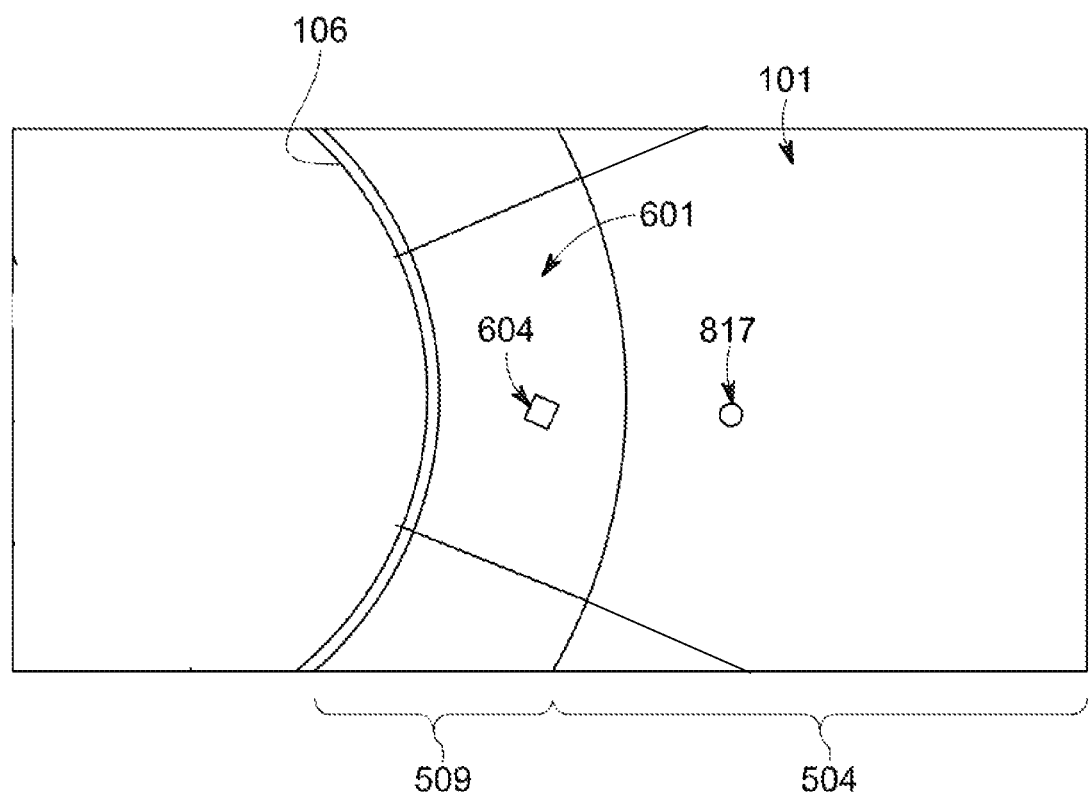
FIG. 8 is an enlarged view of a stationary member showing a light beam impinged on the top surface.

FIG. 8 depicts the top close-up view of a "short leg" section or sector 601 of the stationary member 101 when the focused input light beam 604 is stationary (and not rotating). In this embodiment the first transparent surface 509, which is nearest the central hole defined by inner wall 106, is generally transparent so that the focused input light beam 604 can penetrate the surface of the stationary member 101. The input light beam 604 is then reflected off two surfaces and against the bottom surface of the second region 504, which is depicted as a visible "dot" 817 because the region 504 is translucent or transmissive.

Figure 9:
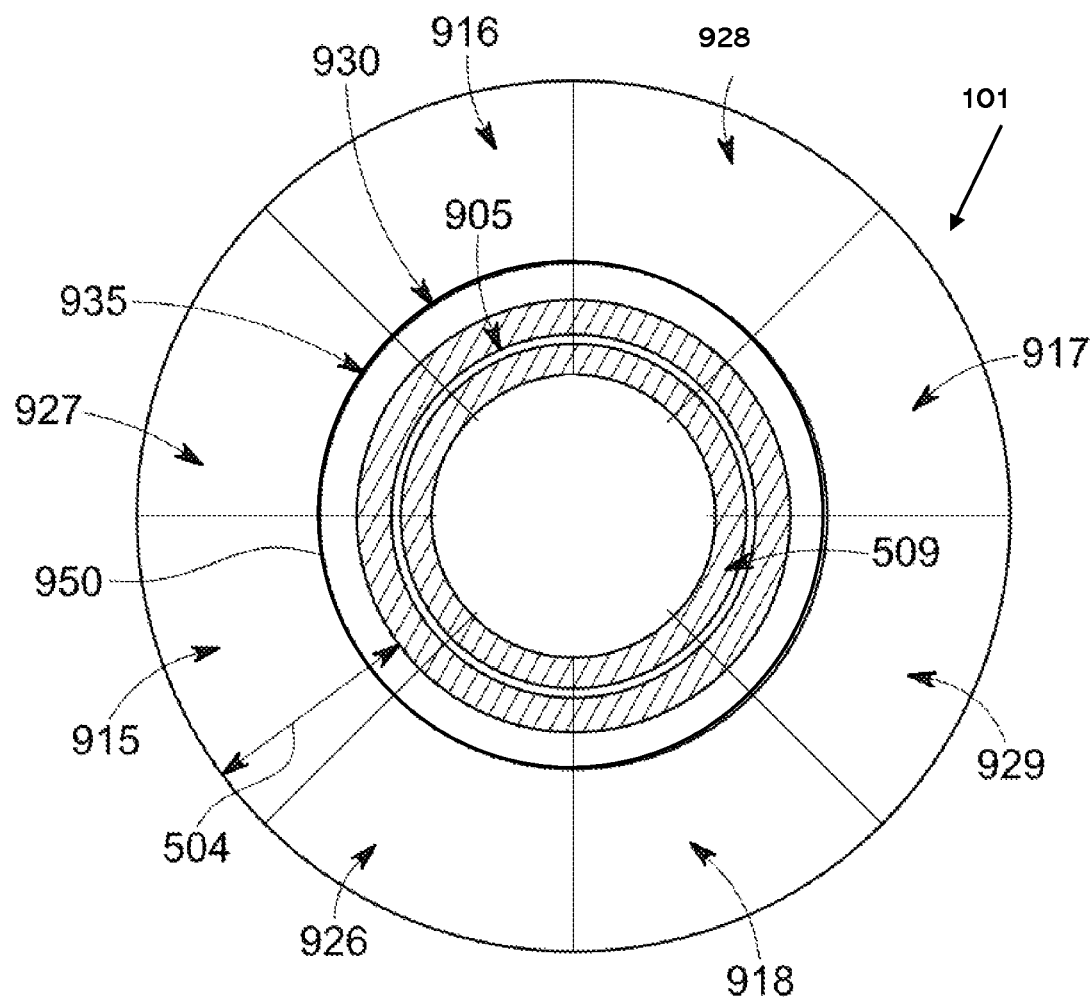
FIG. 9 is a view of a stationary member showing a light beam pattern when the boring member and light beam source is perpendicularly aligned with the stationary member and rotating.

FIG. 9 depicts the top view of the stationary member 101 as the focused light beam 604 also rotates about the inner transparent first surface 509 in a generally circular pattern. In this embodiment, the stationary member 101 contains a total of eight alternating pie-shaped "short legs" sections 915, 916, 917 and 918 and "long leg" reflective surface configuration sections 926, 927, 928 and 929. Each of the four "short leg" reflective surface configuration sections produce a pattern such as arch 930 on the inside of the second region 504 which is visible because the second region 504 is translucent or transmissive. Likewise, each of the four "long leg" reflective surface configuration sections also produce a pattern, such as arc 935 on the inside of the second region 504 which is also visible because the second region 504 is translucent or transmissive. When the rotary boring tool is perpendicular to the stationary member 101 (and thus the worksurface), an incoming beam creates a circle pattern 905 as it enters stationary member 101 and the arc patterns produced by each of the reflective surface segments align as a continuous circle 950.

Figure 10:
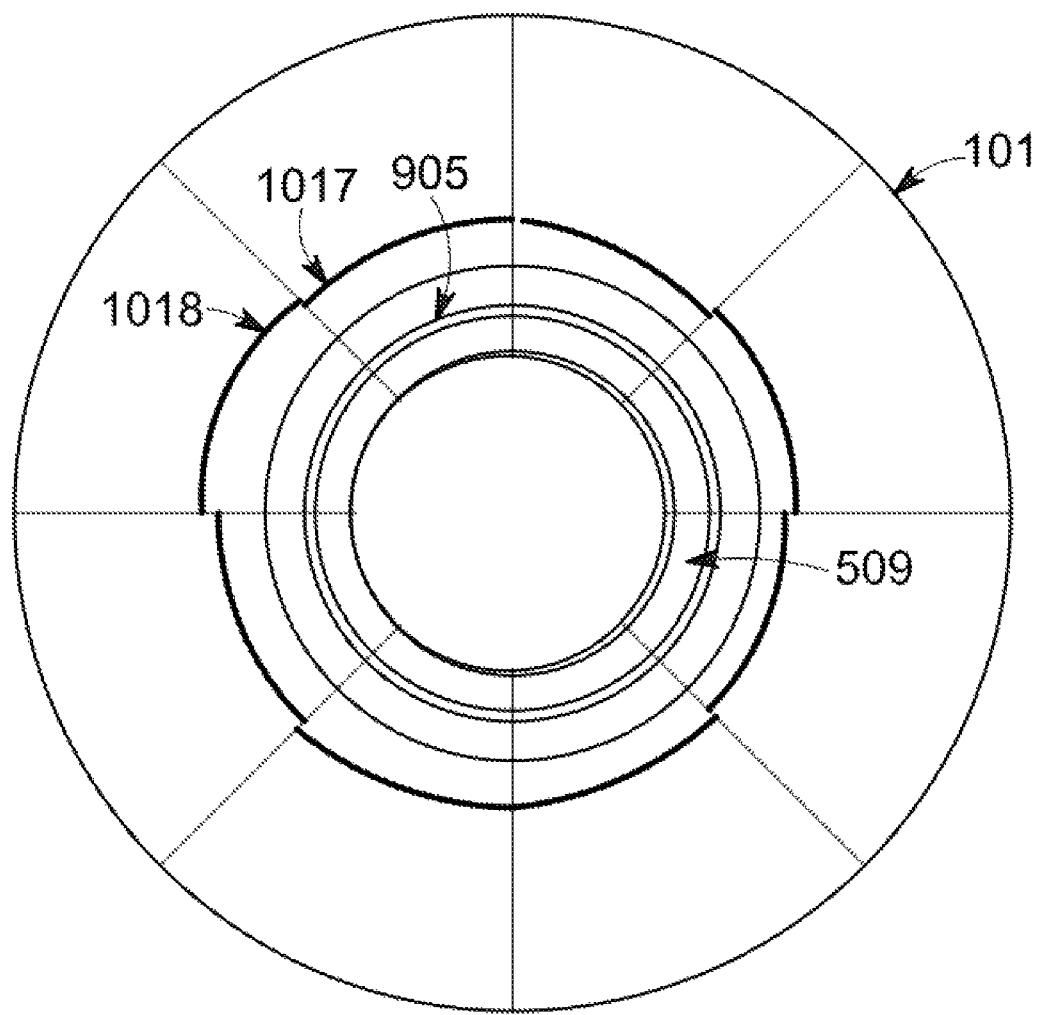
FIG. 10 is a view of a stationary member showing a light beam pattern when the boring member is misaligned with tilt in a direction to the left of perpendicular and creating an obtuse angle with respect to the top surface of the stationary member.

FIG. 10 is similar to FIG. 9 but depicts the misalignment pattern when the rotary boring tool is misaligned (tilted or not perpendicular) with respect to the stationary member 101 and thus the worksurface. In FIG. 10, the arc patterns 1018 and 1017 produced by the "short leg" 930 and "long leg" 935 reflective surface configurations sections do not line up which indicates a misalignment. Like the previous figures, the light enters in region 509 which is transparent. The entry beam 905 is depicted as a ring as the beam is rotated but since the light passes through the transparent surface, it is not visible to the user.

Figure 11:
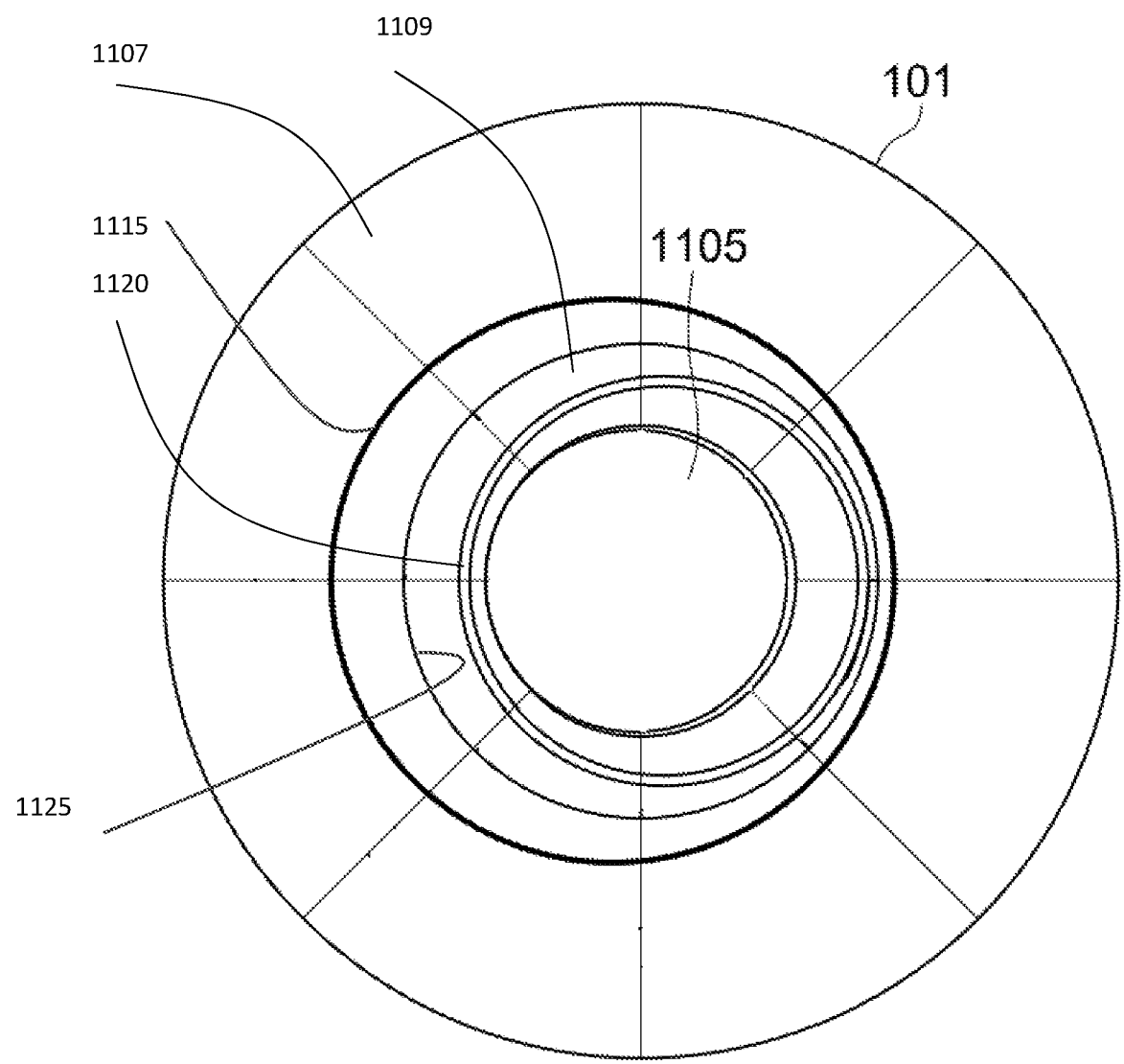
FIG. 11 is a view of a stationary member showing a light beam pattern when the tip of the boring member (on the worksurface) is not centered in the central opening of the stationary member but the boring member and light beam source are perpendicularly aligned with the stationary member and rotating.

FIG. 11 is similar to FIG. 9, but in this case the drill bit tip is not centered in central hole 1105 of the stationary member 101. In this case the drill bit is perpendicular to the stationary member 101 and the resulting patterns produced by each of the reflective surface configuration sections align as a continuous circle 1115 even though the drill bit tip is not centered in the central hole. Like in the previous figures the top surface has an inner transparent region 1109 and exterior translucent region 1107 and the boundaries are demarked by circle 1125. A beam enters the transparent region along path 1120 through transparent region 1109. This example represents an advantage of the rotary boring tool alignment system as the power drill user does not necessarily need to place the drill bit tip at the exact center point of the central hole 1105 of the stationary member 101 to determine alignment or misalignment with regards to the worksurface.

Figure 12:
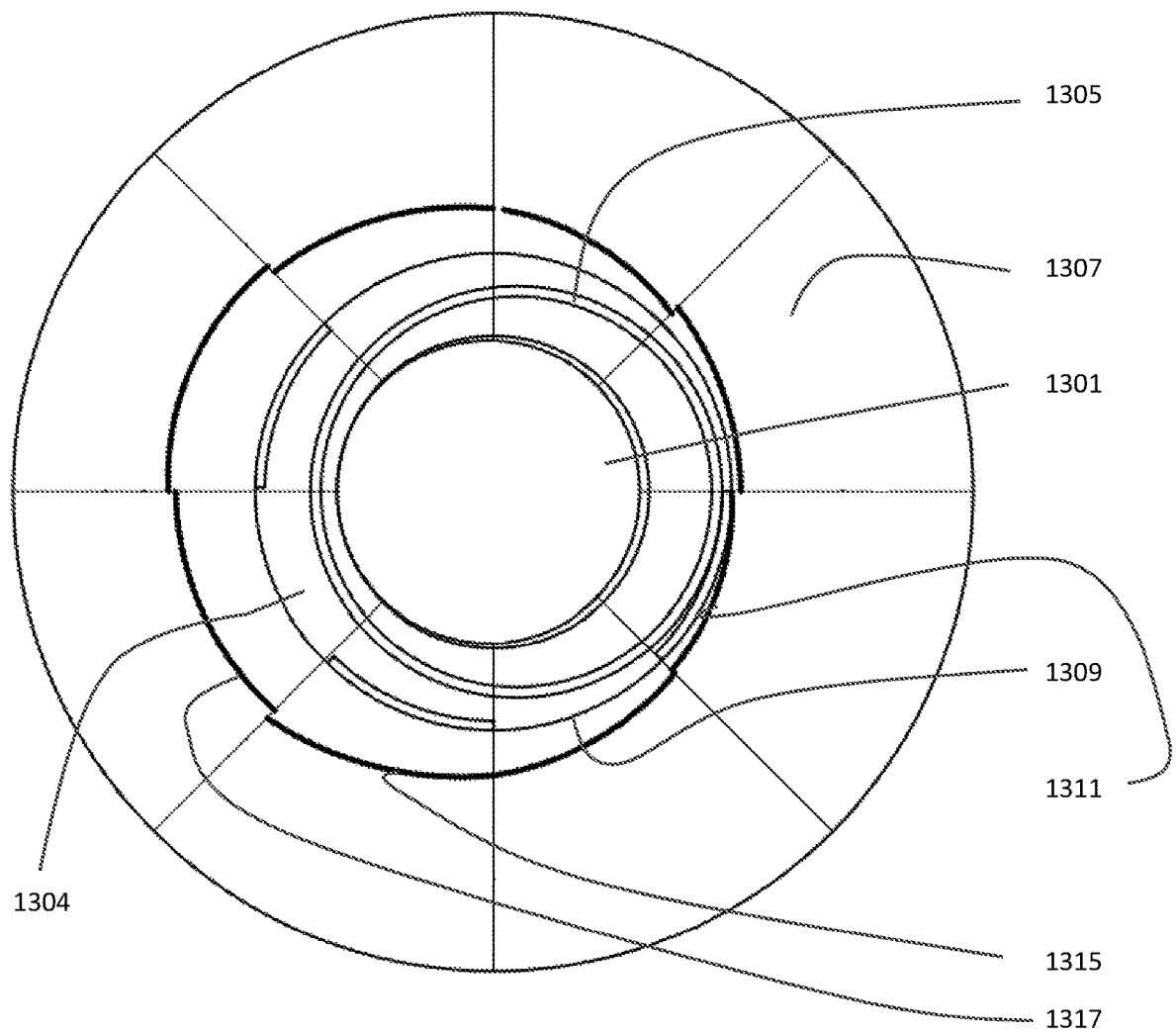
FIG. 12 is an illustration of a misalignment pattern when the tip of the boring member (on the worksurface) is not centered in the stationary member and the boring member is misaligned with tilt in a direction to the left of perpendicular and creating an obtuse angle with respect to the top surface of the stationary member

FIG. 12 depicts a misalignment pattern wherein an incoming beam, which enter along path 1305 in the transparent region 1304, is neither centered in hole 1301 nor perpendicular with the top surface of stationary member. As seen in this figure, when light is reflected to the translucent region 1307, the visible patterns made by lines 1311, 1315 and 1317 do not align. Reference no. 1309 demarks the boundary between the inner region 1304 and outer region 1307.

Figure 13:
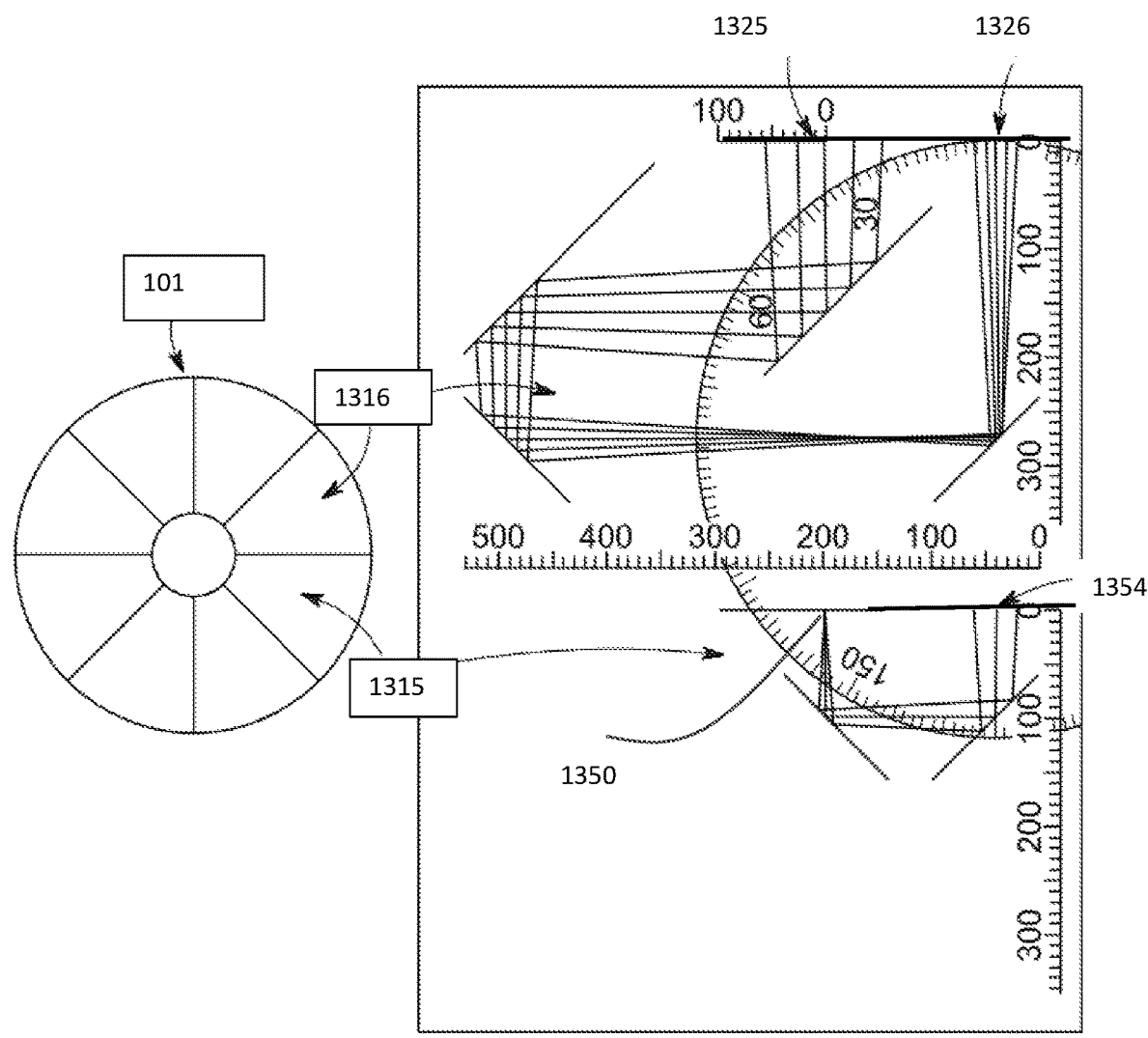
FIG. 13 is an illustration of different configurations of the reflective paths in both the short leg inner segment and long leg outer segments.

FIG. 13 is a schematic depiction of light paths from a short leg path segment 1315 and a long leg path segment 1316 of the stationary member 101. Long leg segment entry paths 1326 depicts paths with a different entry angles into the stationary member 101 and different exits at 1325. The paths which are depicted result from entry angles that progressively become tilted at more severe angles. The drawing therefore provides example of where the beam enters the transparent surface for perfect alignment and other angles. The misalignment exits points 1325 for the "long leg" path segment 1316 are significantly different than from the short leg path segment 1315 which exit at the substantially the same location 1350 regardless of the misalignment at the entry location 1354. These differences are responsible for the misaligned arc patterns or discontinuous circles.

Figure 14A:
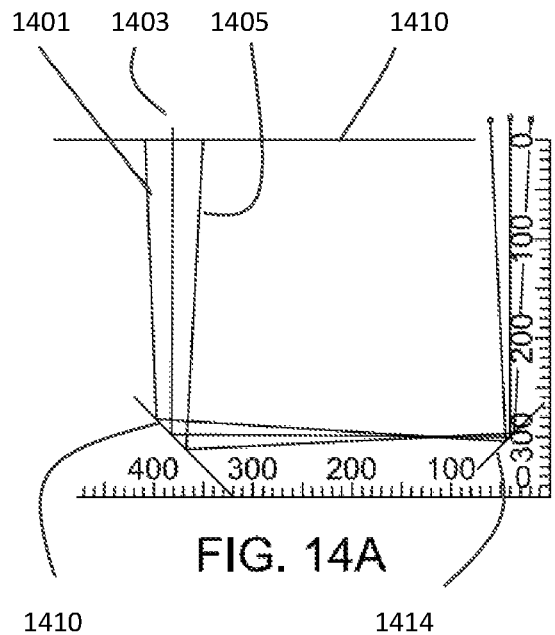
FIG. 14A is an illustration of the light paths thought the stationary member according to a first configuration of reflective surfaces.

FIG. 14A depicts a plurality of light paths in a first long leg segment and includes a light path having a beam 1403 illustrating a beam entry of the top surface 1410 at a perpendicular angle, beam 1401 reflect a beam entry a first angle and a beam entry 1405 that reflects a beam entry at a second angle. This arrangement uses two mirrors, 141 and 1414 and the path of the beam is relatively long when compared to a short leg path.

Figure 14B:
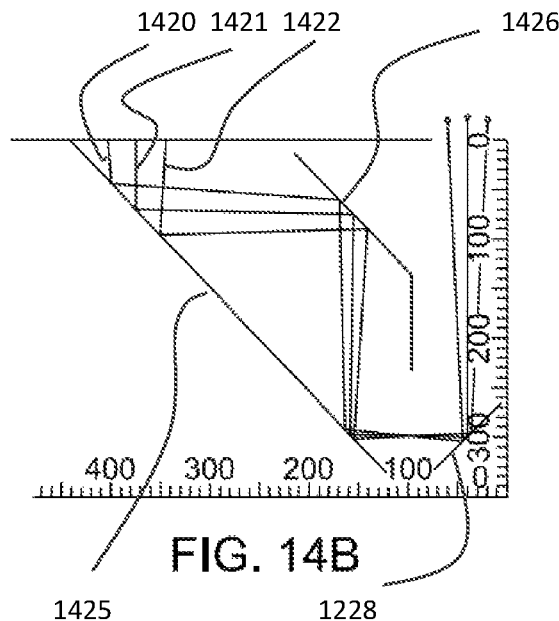
FIG. 14B is an illustration of the light paths thought the stationary member according to a second configuration of reflective surfaces.
Figure 14C:
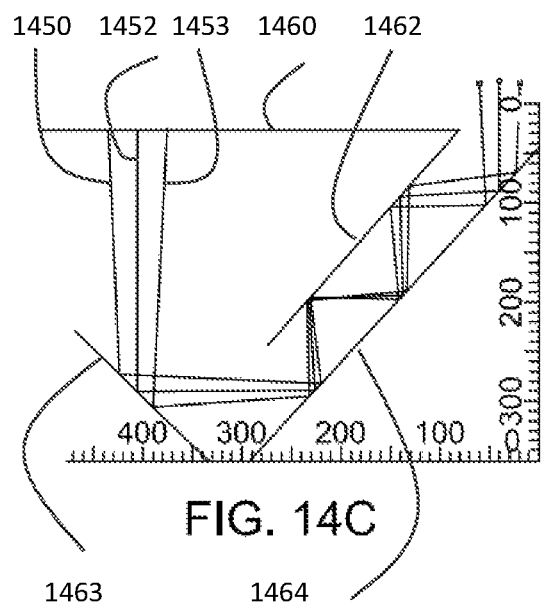
FIG. 14C is an illustration of the light paths thought the stationary member according to a third configuration of reflective surfaces.
Figure 14D:
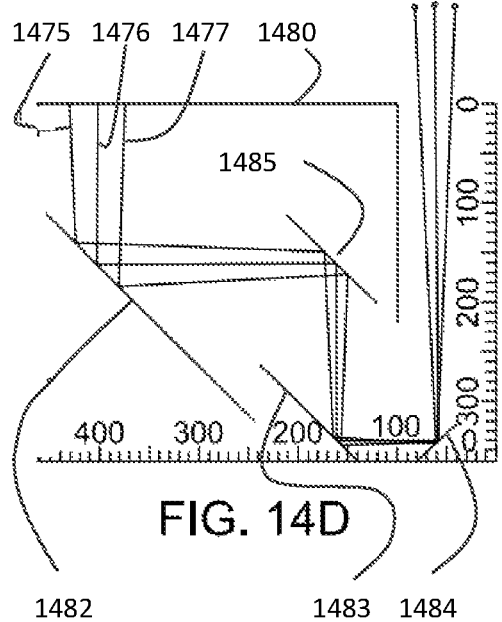
FIG. 14D is an illustration of the light paths thought the stationary member according to a fourth configuration of reflective surfaces.

FIG. 14B, FIG. 14C and FIG. 14D depict different "long leg" beam paths created by different mirror arrangements. For example, in FIG. 14B beam 1421 is reflected from mirror 1228, to surface 1425, to surface 1426 and then back to surface 1425 and then to the bottom surface of the top layer. FIG. 14C depicts beam 1450,1452 and 1453 which impinge on surface 1460. These beams are reflected back and forth multiple times on surfaces 1464 and 1462 and then direct to surface 1463. FIG. 14D depicts another arrangement wherein beams 1475, 1478 and 1477 are reflected off surfaces 1484, then 1483, then 1485, then 1482 and finally impinge on surface 1480. In each of FIGS. 14B-14D the beam entry location is at a location on the right top area of the Figure.

The sections that follow provide greater detail on several additional alternative embodiments and features. The features discussed in each individual embodiment can be used singularly in that embodiment or in combination with each other. Further, one or more features from each individual embodiment can also be applied to or included in other individual embodiments. For example, a potential implementation of the system might include a work surface alignment feature and a centering marker feature, while another may simply include a work surface alignment feature alone.

A person having ordinary skill in the art to which said subject matter pertains will understand that there are alternative potential configurations for this invention. For example, while the present invention depicts embodiments with eight alternating circle segments, embodiments with additional segments or fewer segments may be advantageously used. Further, different reflective surface configurations may be used in the short leg and long leg segments.

In embodiments, the light source for the focused light beam is powered by a battery. In other embodiments, it is powered by the motion of the rotational portion of the drill. In yet further embodiments, the light source is powered by a combination of the rotational portion of the power drill and a battery. In yet other embodiments the light source for the focused light beam is powered by the same power source as the drill. The battery in any such implementation can be anything known in the art including but not limited to disposable, rechargeable, etc.

In various embodiments, the light source is automatically activated by the rotational motion of the rotational portion of the drill. In other embodiments, the light source can be manually activated by a power switch. In yet other embodiments, the system contains both automatic and manual light source triggering that is configurable by the user.

In a further embodiment, a separate additional light is provided in or about the center hole of the stationary member to provide illumination of the work surface where the drill bit engages the work surface.

The stationary member can either be held in place on a work surface by a person during drilling operations, secured by gravity, or temporarily attached to a work surface with a releasable adhesive, small pins, tacks, tape, suction devices (for temporary attachment to hard smooth surfaces such as aluminum, metal, plastic, etc.), magnets (for temporary attachment to metallic surfaces). In various embodiments the stationary member is designed to be used with a certain type of work surface and thus is configured with attachment technology for that work surface type. In various other embodiments, the stationary member has the ability to incorporate different types of attachment technology on an "as-needed" basis thus allowing a single stationary member to adapt to and work with a variety of work surfaces.

In the embodiment described above, the stationary member 101 has a body that is flat on the bottom side that contacts the work surface so as to mirror the plane of the work surface. In other embodiments, the lower surface may be designed to mirror non-flat or angled surfaces. For example, the aerospace industry must often drill holes in surfaces that are typically curved or angled. In these cases, a customized version of the stationary member 1 could be created and utilized for these non-flat, angled or even compound surfaces. This same type of customized stationary member approach can be applied to many specific boring purposes across many different industries.

In the embodiment described above the stationary member has a generally cylindrical body with a hole in the center that exposes the work surface. In other embodiments, the stationary member body and/or the position or shape of the hole may be designed for specific boring purposes. For example, deck builders must often bore long holes through sets of large posts and beams with the intent of using these holes for bolts that secure the posts and beams together. Since such holes are typically centered across the work surface, such as a post or beam having a square profile, the body of the stationary member may be customized as square or rectangular so as to consistently fit on the posts or beams so that the hole is centered within the post or beam. This same type of customized stationary member approach can be applied to many specific boring purposes across many different industries. Accordingly, the shape and size of the stationary member is not limited to cylindrical bodies but can be other shapes or configurations that meets the functional needs of the use case.

In further embodiments, the stationary member includes a laser or light-based centering marker within the center hole that is projected on the work surface. This provides the power drill user with a reference for the absolute center of the stationary member. It is designed to help the power drill user to center the tip of the drill bit on the work surface prior to and/or during of drilling operations so that it is within the operational confines of the stationary member. The centering marker can be anything known in the art, including but not limited to a crosshair or dot. In various embodiments the centering marker is activated by a power switch on the stationary member. In other embodiments, the centering marker is activated by the rotational motion of the rotational member of the power drill.

In various embodiments, the system may also provide a power drill user with the ability to quickly visualize the depth of a drill bit as it bores into a work surface. This can be important because the power drill user may need to limit or monitor the depth of their drilling operations. This feature may be used alone or in combination with other features, such as work surface alignment.

In an embodiment, a distance sensor is included in the stationary member. This distance sensor interacts with the rotating member or some portion of the rotary boring device or bit, to determine the distance between the two objects and thus the depth or distance bored into the work surface by the drill bit. In an embodiment, the depth or distance traveled into the work surface by the drill bit can be depicted on or about the stationary member by any type of display or notification known in the art, including but not limited to a digital display, a projected display, an LED or LED array, or an audible tone. The distance sensor utilized can be also anything known in the art, including but not limited to infrared, laser, ultrasonic, microwave, or other distance sensing technologies.

In an alternative drill bit depth sensing embodiment, a distance sensor is mounted in the rotating member. This distance sensor interacts with the stationary member 101 to determine the distance between the two elements and thus the depth or distance bored into the work surface by the drill bit.

In yet a further embodiment, a distance sensor mounted in the rotating member interacts with a work surface directly to determine the depth or distance traveled into the work surface by a drill bit. This depth or distance traveled into a work surface by the drill bit can be depicted on or about the stationary member by a display such as a digital display, a projected display, and LED or LED array, or an audible tone. Distance sensor technologies that can be used with this embodiment include infrared sensors, optical sensors, ultrasonic sensors and microwaves.

In yet another embodiment of the system using a drill bit depth sensing feature, the drill bit and stationary member uses linear encoding and a sensor to determine depth or distance traveled into the work surface by the drill bit. In an embodiment, a drill bit itself is encoded with patterns that are detected by a sensor in the stationary member and then translated into depth or distance traveled into the work surface by the drill bit. The linear encoding and sensing technology utilized can be performed by other known techniques in the art, including but not limited to optical or magnetic.

In further embodiments the system provides an ability to detect sub-surface elements such as studs, electrical conduit, steel, or other sub-surface objects. In an embodiment, a stud sensor is included in the stationary member which interacts with the work surface to determine if a stud is located directly underneath the portion of the work surface that is below the stationary member. In an embodiment the stud sensor utilized can be anything known in the art, including but not limited to an electronic sensor (or sensors) that detect changes in the dielectric constants. Further, other embodiments may include additional or improved stud-sensing capabilities, such as stud edge detection, stud center detection, or other such capabilities known in the art. For purposes of notification, the stationary member 101 may include a user notification device or system. The notification device or system can be anything known in the art, including but not limited to a digital display, a projected display, an LED or LED array, an audible tone or tactile feedback.

In a further embodiment, a dust and debris collection or mitigation feature is integrated into the stationary member. This feature serves to improve the clarity of the visual pattern on the stationary member and keeps the work area clean. In an embodiment, the stationary member contains a reservoir into which drilling dust or debris is routed. In embodiments, the movement of the debris is assisted using a fan mounted within the stationary member. In a further embodiment, the stationary member simply routes dust through one or more passages that allow it to be evacuated outside of the stationary member.

Embodiments of the system may also use wireless communications capabilities between the two members and/or with other wirelessly enabled devices such as smart phones or other machinery. This wireless communications capability can be used to communicate, either bidirectionally or unidirectionally, data or commands relevant to a boring operation, or anything known in the art, including but not limited to work surface alignment data, drill bit depth data, sub-surface sensing data, dust collection data, system power data, drill or boring machinery data (such as motor temperature, speed, rotational direction, etc.), and operational commands.

In a previously described embodiment that utilizes a distance sensor in the rotational member, the rotational member communicates its distance sensor data wirelessly with the stationary member which then translates the distance data into some type of visual depiction, display, notification, or audio signal for the user.

In another embodiment, the rotational member sends a wireless signal containing an activation command to the stationary member when the rotational force of a drilling operation begins. This activation command could be used to activate one or more features in a stationary member including but not limited to activating a display or activating a worksurface illumination feature. A similar wireless signal can also be used to deactivate one or more features in the stationary member when the rotational force of a drilling operation ends.

In another embodiment, a wirelessly enabled drill communicates with the stationary member which then translates the data into a display or notification for the user. In embodiments data about the drill itself or drilling operation, such as motor temperature, bit temperature, speed, rotational direction, etc., or operational commands are captured and sent by wireless signal. Alternatively, the stationary member communicates data or commands wirelessly with the drill. For example, in an embodiment, after a predetermined boring depth has been met and sensed by the stationary member, the stationary member sends a wireless command to the drill to turn off the power.

In another embodiment, one or more of the system members communicate data or commands wirelessly to and from an external wireless device, such as a smart phone. The data or commands wirelessly communicated signals include data relevant to a boring operation including work surface alignment data, drill bit depth data, sub-work surface sensing data, dust collection data, system power data, drill or boring machinery data, and operational commands.

Even though numerous characteristics and advantages of the embodiment have been set forth in the foregoing description, together with details of the methods and devices and function of the embodiment, the disclosure is illustrative only, and changes may be made in detail, especially in the matters of the procedures, shapes, dimensions, options, and arrangement within the principles of the present disclosure to the full extent indicated by the broad general meaning of the terms in which the appended claims are expressed.

Figure 15:
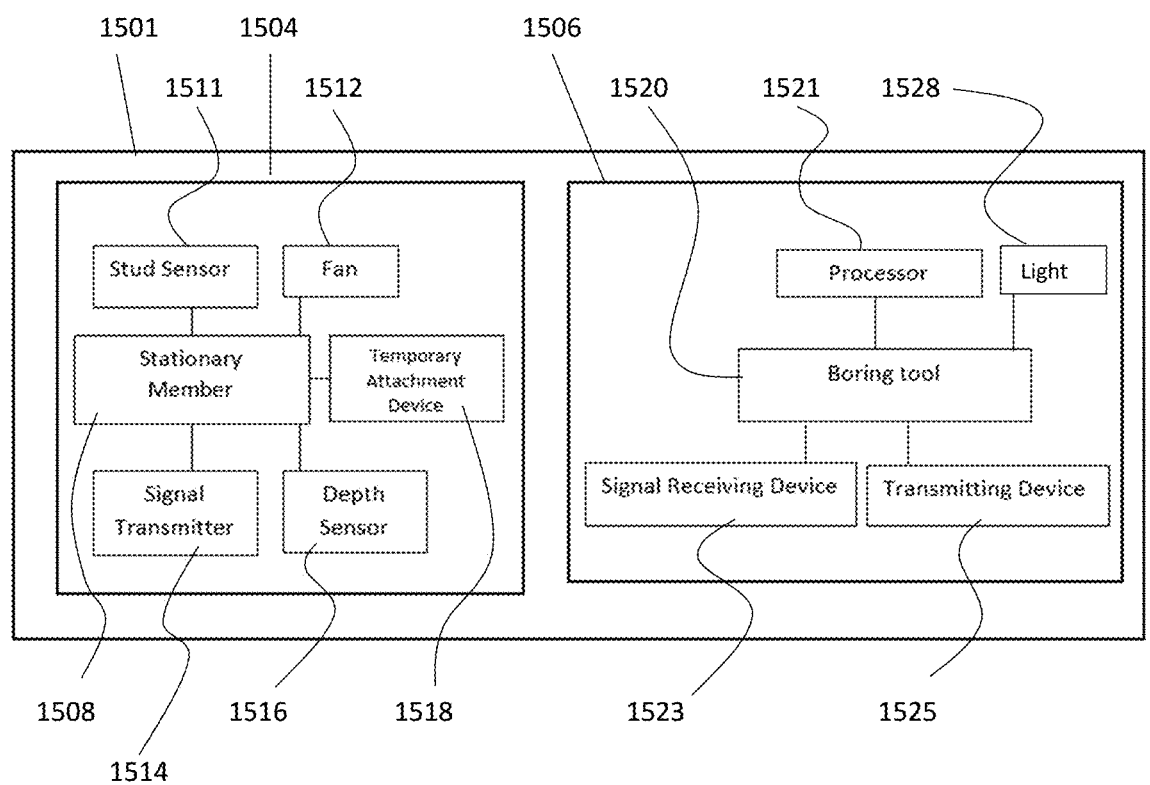
FIG. 15 is a schematic illustration of a rotary boring tool assembly and stationary member assembly.

Referring now to FIG. 15, a system 1501 that includes a stationary member assembly 1508 and boring tool assembly 1520 is depicted. Stationary member assembly 1504 includes stationary member 1508, stud sensor 1511, fan 1512, signal transmitter 1514, depth sensor 1516 and temporary attachment device 1518. The boring tool assembly 1506 includes boring tool 1520, processor 1521, light 1528, signal receiving device 1523 and signal transmitting device 1525. Processor 1521, signal receiving device 1523 and signal transmitting device 1525 may be integrated or separate from boring tool 1520.

The invention claimed is:

1. A device to assist the alignment of a boring tool, said device comprising
a hollow member with a central opening, said hollow member having a top layer, said top layer having a transparent inner region and a translucent outer region,
said hollow member further comprising a set of internal reflecting surfaces that define a first path internal to said hollow member, said first path proceeding from said transparent inner region to said translucent outer region, wherein when a light beam is directed toward said device, said beam passes through said transparent inner region, and is reflected to a location wherein it impinges on a bottom surface of said top layer in said translucent outer region.

2. The device recited in claim 1 further comprising a second set of reflecting surfaces, said second set of reflecting surfaces defining a second path, said second path having a length that is a longer than the length of said first path, wherein when a rotating beam of light is directed to said transparent inner region and said beam is perpendicular to said top layer, the light reflected back to the bottom surface of said top layer impinges at the same radial location as light that travels from said second path, and when said beam is not perpendicular to said top layer, the location of the impingement of the beam that travels along the first path is at a different radial location than a light beam that travels in said second path.

3. The device recited in claim 2 wherein said device is annular and comprises a plurality of sectors, wherein said sectors comprise alternative first path sections and second path sections.

4. The device recited in claim 1 wherein said member further comprises a sensor to measure the depth of a boring tool as it passes through said central opening and a signal transmitter to communicate information relating to said depth.

5. The device as recited in claim 4 wherein said signal transmitter communicates a visible signal.

6. The device as received in claim 5 wherein said signal transmitter communicates an audio signal.

7. The device as recited in claim 4 wherein said signal transmitter transmits a wireless signal.

8. The device as recited in claim 1 wherein said device further comprises a fan wherein said fan creates an air current to clear debris from said central opening.

9. The device as recited in claim 1 further comprising a sensor to detect the presence of studs or joists beneath said device.

10. The device as recited in claim 1 wherein said stationary member further comprises a temporary attachment device to secure said device on a work surface.

11. The device as recited in claim 1 wherein said stationary member further comprises a cutting tool orientation device, said orientation device comprising a pair of light beams, perpendicular to one another and projected from the interior sides of said device and downwards and towards a work surface on which the member is positioned thereby creating a crosshair.

12. The device as recited in claim 1 wherein said stationary member further comprises a cutting tool orientation device, said orientation device comprising a light beam projected from the interior sidewall of said device and toward a work surface on which the member is positioned thereby creating a visible dot on said worksurface.

13. A system for the alignment of a boring tool, said system comprising a light source for creating a focused beam of light, said light source adapted to be attached to a penetrating cutting element that is rotated by said boring tool, and a stationary member, said stationary member having a top layer with a transparent region and a translucent region, said stationary member further comprising a first set of internal reflective surfaces that are oriented to direct said focused beam of light that passes through said transparent region to a bottom surface of said top layer to impinge at a location in said translucent region and thereby define a first path, wherein when said light source is rotated said light beam creates a visible image in the shape of an arc on the transparent region of said stationary member.

14. The system of claim 13 wherein said stationary member further comprises a second set of internal reflective surfaces that are oriented to direct said focused beam of light that passes through said transparent region of said top layer to said bottom surface of said top layer at a location on said top layer that is said translucent region, wherein when said light is rotated said light beam creates a visible image in the shape of an arc on the transparent region of said stationary member.

15. The system of claim 13 where said stationary member comprises an annular disk with a central opening and said transparent region is inside said translucent region.

16. The system recited in claim 15 wherein said stationary member is annular and comprises a plurality of sectors, wherein said sectors comprise alternative first path sections and second path sections.

17. The system recited in claim 15 wherein said stationary member further comprises a sensor to measure the distance traveled of said penetrating cutting element as it passes through said central opening and into a work surface and a signal transmission device to communicate information relating to said measurement.

18. The system recited in claim 17 wherein said signal transmission device communicates a visible signal.

19. The system received in claim 17 wherein said signal transmission device communicates an audio signal.

20. The system as recited in claim 17 wherein said signal transmission device transmits a wireless signal.

21. The system recited in claim 20 further comprising a signal receiving device that receives said signal from said stationary member and a processor adapted to processes said signal and a transmitting device that provides an output in response to said signal.

22. The system as recited in claim 21 wherein said output signal provides a command to stop the rotation of said penetrating cutting member.

23. The system as recited in claim 15 wherein said stationary member further comprises a fan wherein said fan creates an air current to clear debris from said central opening.

24. The system as recited in claim 15 further comprising a sensor to detect the presence of studs or joists beneath said stationary member.

25. The system recited in claim 15 where said signal is transmitted when said penetrating cutting element is not in perpendicular alignment with said top layer.

* * * * *